(12) United States Patent
Cobb

(10) Patent No.: US 6,464,031 B1
(45) Date of Patent: Oct. 15, 2002

(54) MOTORIZED VEHICLE

(76) Inventor: Michael B. Cobb, 913 E. 118th St., Los Angeles, CA (US) 90059

( * ) Notice: Subject to any disclaimer, the term of this patent is extended or adjusted under 35 U.S.C. 154(b) by 0 days.

(21) Appl. No.: 09/838,473

(22) Filed: Apr. 18, 2001

Related U.S. Application Data

(63) Continuation-in-part of application No. 09/552,015, filed on Apr. 19, 2000.
(60) Provisional application No. 60/130,393, filed on Apr. 19, 1999.

(51) Int. Cl.[7] .............................................. B62D 61/02
(52) U.S. Cl. ...................................... 180/230; 180/205
(58) Field of Search ................................ 180/219, 220, 180/230, 231, 205, 206, 207

(56) References Cited

U.S. PATENT DOCUMENTS 3,756,338 A * 9/1973 Goodridge ........... 200/61.58 B
3,954,145 A * 5/1976 Nesbit ........................ 180/230
4,267,898 A * 5/1981 Wheaton .................... 180/205
4,585,087 A * 4/1986 Riccitelli ................... 180/219
4,702,340 A * 10/1987 Hamilton ................... 180/219
5,388,659 A * 2/1995 Pepe .......................... 180/208
6,011,366 A * 1/2000 Murakami et al. .......... 180/220
6,305,485 B1 * 10/2001 Kwan ........................ 180/205
6,341,660 B1 * 1/2002 Schiller ..................... 180/220

FOREIGN PATENT DOCUMENTS

FR     2 628 054     *   3/1988

* cited by examiner

Primary Examiner—Kevin Hurley
(74) Attorney, Agent, or Firm—James G. O'Neill

(57) ABSTRACT

A motorized bicycle, uses a bicycle-type frame, having a front wheel and rear wheel rotatably attached thereto. A horizontal shaft internal combustion engine is supported in the frame and linked to a drive train with a pedal actuated or automatic clutch, for selectively allowing the engine to be engaged to drive the rear wheel. The drive train may include a number of pulleys and belts or sprockets and chains. A throttle is provided for controlling the engine, and brakes are provided for slowing the wheels of the bicycle.

6 Claims, 4 Drawing Sheets

MOTORIZED VEHICLE

CROSS REFERENCES TO RELATED APPLICATIONS

This application relates to subject matter contained in provisional patent application Ser. No. 60/130,393, filed in the United States Patent Office on Apr. 19, 1999, and is a continuation-in-part of pending application Ser. No. 09/552,015, filed Apr. 19, 2000.

BACKGROUND OF THE INVENTION

1. Technical Field

The invention relates generally to a motorized vehicle and particularly, to a bicycle-type vehicle which utilizes a horizontal shaft lawn-mower-type engine to drive a rear wheel of the vehicle.

2. Description of the Prior Art

Bicycling is an activity preferred by many people for several reasons. First, bicycling is an enjoyable pastime. The thrill of moving along in the open air attracts numerous people to bicycle riding. Second, bicycling is a great exercise. The degree of exercise is determined by the distance traveled, and the type of terrain traversed. Third, bicycling is environmentally friendly transportation. Bicycling causes no toxic by-products, other than the carbon dioxide expelled from the bicyclist's lungs.

However, bicycling is limited by the ability and/or stamina of the rider. Some people cannot pedal a bicycle, while others become tired, making cycling an unpleasant task. Further, a rider is often deterred from attempting to ride in hilly terrain, for fear that he might become tired and be forced to either end the ride or complete the ride beyond the point of exhaustion. Additionally, many persons, because of age, infirmities, or the like, cannot pedal a bicycle.

Several variations on the basic bicycle concept have been developed over the years, in an effort to retain some of the benefits of bicycle riding, while eliminating the drawbacks. In particular, motorcycles, mopeds, and motor scooters have been developed.

Motorcycles give the rider the thrill of outdoor riding, while eliminating the necessity to pedal. Thus, the rider can tackle hilly terrain, and travel along highways, keeping up with traffic. When compared with cars, motorcycles produce considerably less pollution. However, motorcycles require a large engine in order to be capable of maintaining highway speeds, and can be hard to handle because of their size and weight.

Mopeds were developed as an attempt to marry the concept of a bicycle and a motorcycle. Mopeds provide pedals for riding like a normal bicycle, and a relatively small motor for riding like a motorcycle. However, mopeds are still constructed largely like a motorcycle, making them expensive, and difficult to pedal.

Motor scooters were developed as a further attempt at providing inexpensive motorized transportation. Motor scooters are limited, in that they are only suitable for short ranges, and are not acceptable to all persons.

While these units may be suitable for the particular purpose employed, or for general use, they would not be as suitable for the purposes of the motorized vehicle of the present invention, as disclosed hereafter.

SUMMARY OF THE INVENTION

It is an object of the invention to produce a motorized vehicle utilizing a modified bicycle frame that allows the bicycle to be driven under power, without use of pedals.

It is another object of the invention to produce a motorized bicycle that is simplistic in design, so as to be economical to manufacture. Accordingly, the motorized bicycle employs a horizontal shaft lawnmower engine, which is linked to the rear wheel by an interchangeable belt or chain drive system. Additionally, the motorized bicycle of the present invention contains no sprocket and pedals to power the same.

It is a further object of the invention to provide a motorized bicycle that is easy to operate. Accordingly, a hand-operated throttle is provided to rev the engine, and an automatic or foot pedal operated clutch is provided to engage the engine with the interchangeable belt or chain drive system and the rear wheel.

The invention is a motorized vehicle, using a modified or standard bicycle frame, having a front wheel and rear wheel attached thereto, but which does not include pedals and an associated sprocket. An internal combustion engine is mounted to the frame and linked to the drive train with an automatic or foot pedal operated clutch, for selectively allowing the engine to be engaged to drive the rear wheel. A throttle is provided for controlling the engine, and brakes are provided for slowing the wheels of the frame.

To the accomplishment of the above and related objects the invention may be embodied in the forms illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

The objects and features of the present invention, which are believed to be novel, are set forth with particularity in the appended claims. The present invention, both as to organization and manner of operation, together with further objects and advantages, may best be understood by reference to the following description, taken in conjunction with the accompanying drawings, in which:

DESCRIPTION OF THE PREFERRED EMBODIMENTS

The following description is provided to enable any person skilled in the art to make and use the invention, and sets forth the best modes contemplated by the inventor of carrying out his invention. Various modifications, however, will remain readily apparent to those skilled in the art, since the generic principals of the present invention have been defined herein, specifically to provide for a novel and improved motorized vehicle, utilizing a modified or standard bicycle frame, with the pedals and associated drive sprocket removed.

Figure 1:
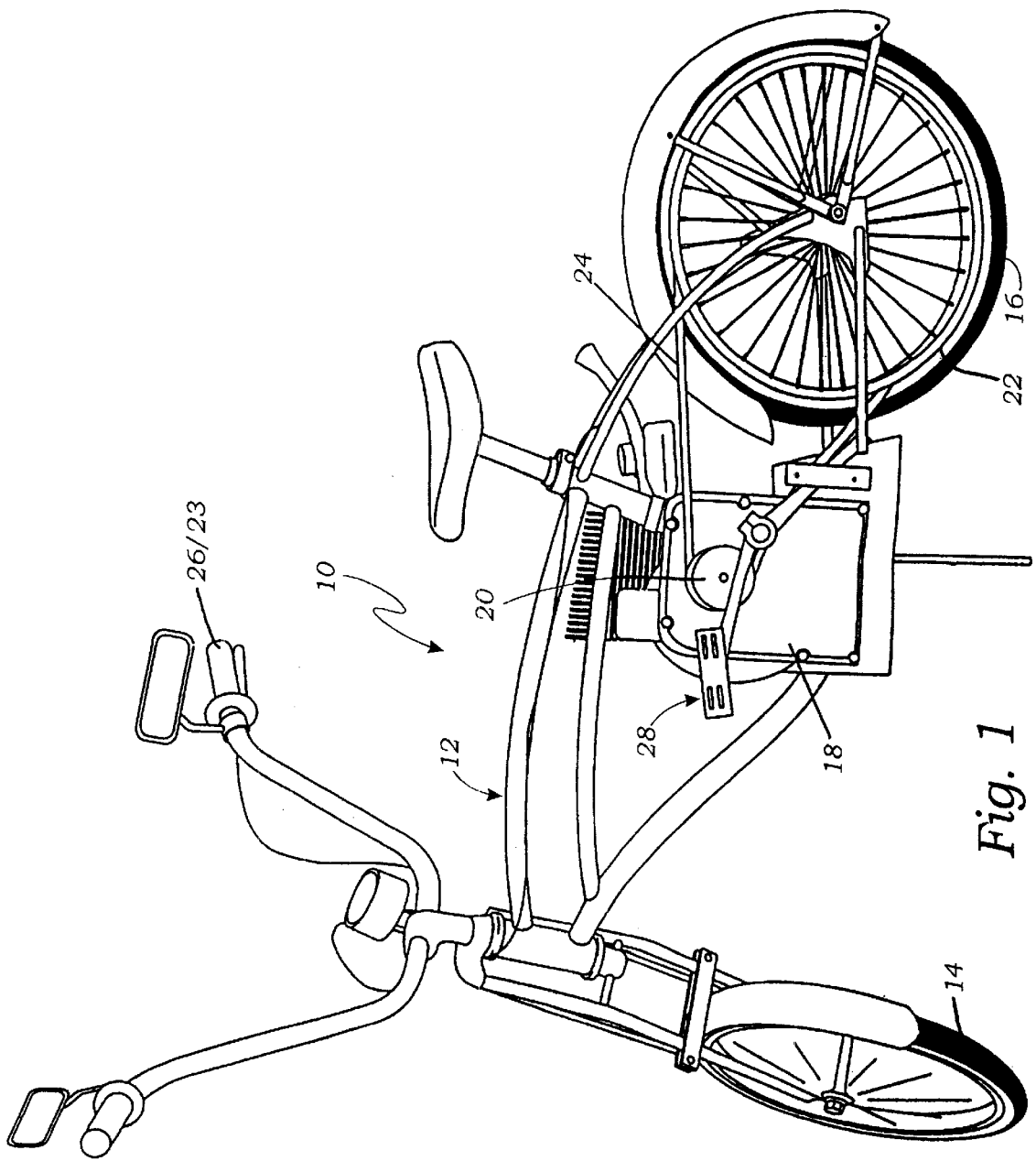
FIG. 1 is a diagrammatic perspective view of a first embodiment motorized bicycle of the instant invention having a motor mounted on one side of the frame of the bicycle.

Turning now to FIG. 1, there illustrated is a first embodiment of a motorized bicycle 10 of the present invention. The motorized bicycle 10 comprises a bicycle-type frame assembly 12, which may be modified or of standard construction, having a front wheel 14 and rear wheel 16 rotatably secured thereto as is well known to those skilled in the art.

Figure 2:
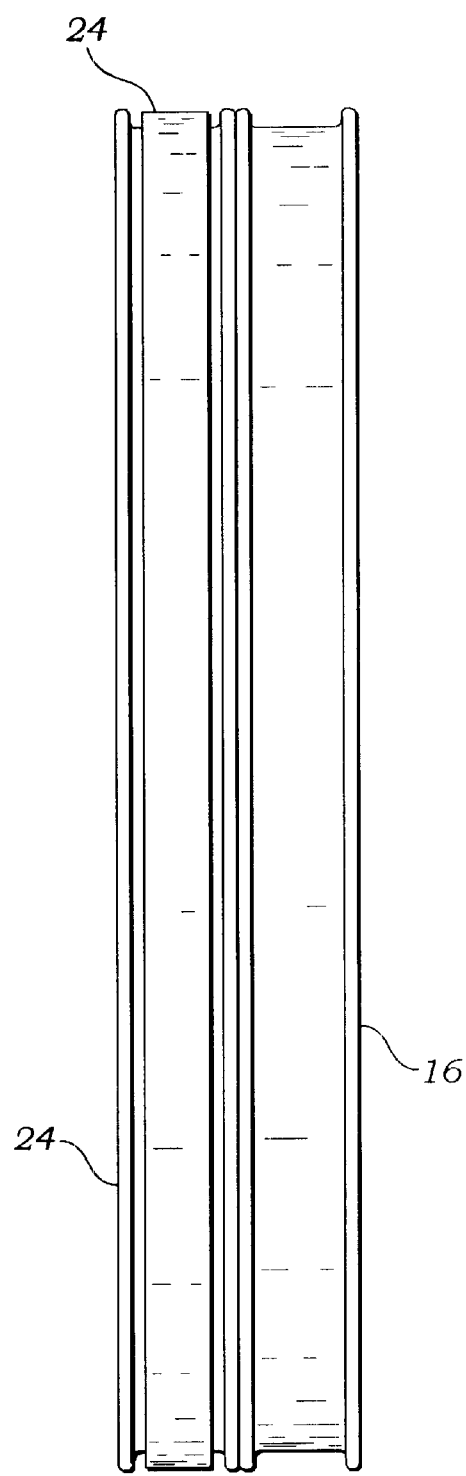
FIG. 2 is a top plan view of a tensioned belt which transmits power from the motor of the instant invention to an extension of a rim which is integral with a rim of a rear wheel of the bicycle of FIG. 1.

In accordance with the present invention, as seen clearly in FIG. 1, a horizontal shaft internal combustion engine 18, such as those commonly employed in lawnmowers and low powered devices of similar type, is secured at one side of a central region of the bicycle-type frame assembly 12 where the pedals and sprocket of a standard bicycle would normally be held. A motor pulley 20 extends from one side of the internal combustion engine 18. As shown in FIGS. 1 and 2, an extension 22 is affixed to or formed concentrically to a rim 23 of the rear wheel 16 of the motorized bicycle 10. This extension extends from the same side of the rim 23 as that from which the motor pulley 20 extends from the side mounted engine 18.

A drive belt 24 forms a continuous loop from the motor pulley 20 to the rear wheel rim extension 22, transmitting power from the internal combustion engine 18 to the rear wheel 16, when a clutch pedal 28 is engaged (see below), causing rotation of the rear wheel and propelling the motorized bicycle 10 laterally. In accordance with the principles of the present invention, the belt and pulley drive train can be interchangeded with a chain drive train. A footrest may be added to the frame 12 or engine 18 to allow a person riding the bicycle 10 to rest the foot not operating the clutch pedal 28.

A throttle mechanism 23, preferably located at a hand grip 26 such as that shown in FIG. 1 allows the user to increase the speed of the internal combustion engine 18 and hence the speed of the motorized bicycle 10. It should be understood, however, that the throttle mechanism 23 may be located at any location upon the bicycle-type frame assembly 12 or related components thereof. In addition, brake levers may be provided at one or both of the handgrips 26, and may be used to control brakes located at the front and/or rear wheels.

The clutch pedal 28, is preferably connected to a spindle wheel that is in communication with the drive belt 24 when the pedal is engaged. The clutch pedal 28 and spindle wheel allow the user to selectively engage the drive belt 24 to propel the bicycle 10. A user may actuate the clutch pedal in order to engage the motor pulley 20 and cause the internal combustion engine 18 to propel the bicycle 10, or may disengage the clutch pedal in order to disengage the motor pulley 20 and stop the engine 18 from propelling the motorized bicycle 10. It should be noted that the engine 18 replaces the normal sprocket and pedals of a standard bicycle. That is, there are no pedals for manually propelling the motorized bicycle 10, therefore making it easier for almost anyone to enjoy riding the motorized vehicle of the present invention.

Figure 3:
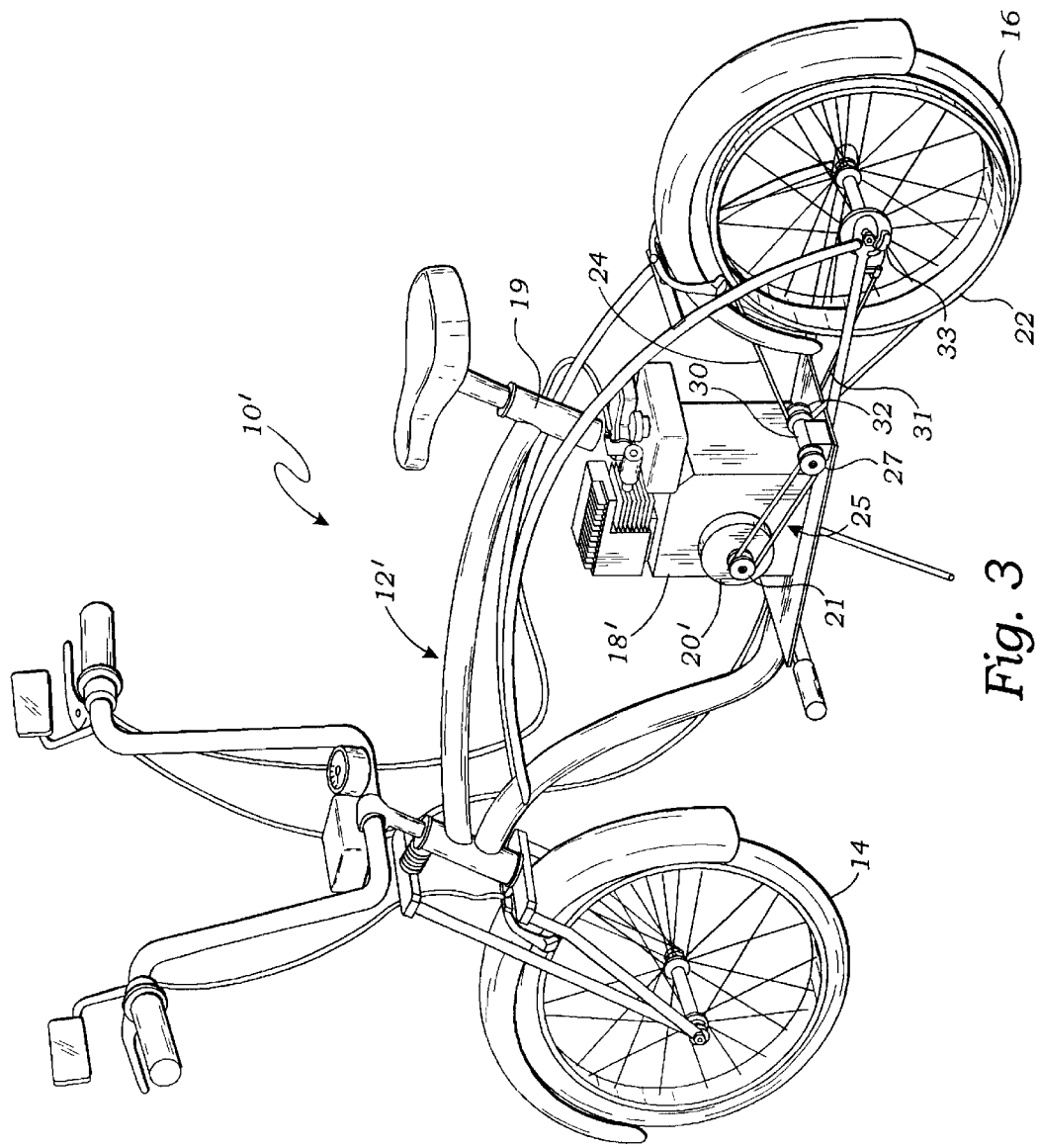
FIG. 3 is a diagrammatic perspective view of a second embodiment of a motorized bicycle of the instant invention having an automatic clutch and a belt drive to a rear wheel.
Figure 4:
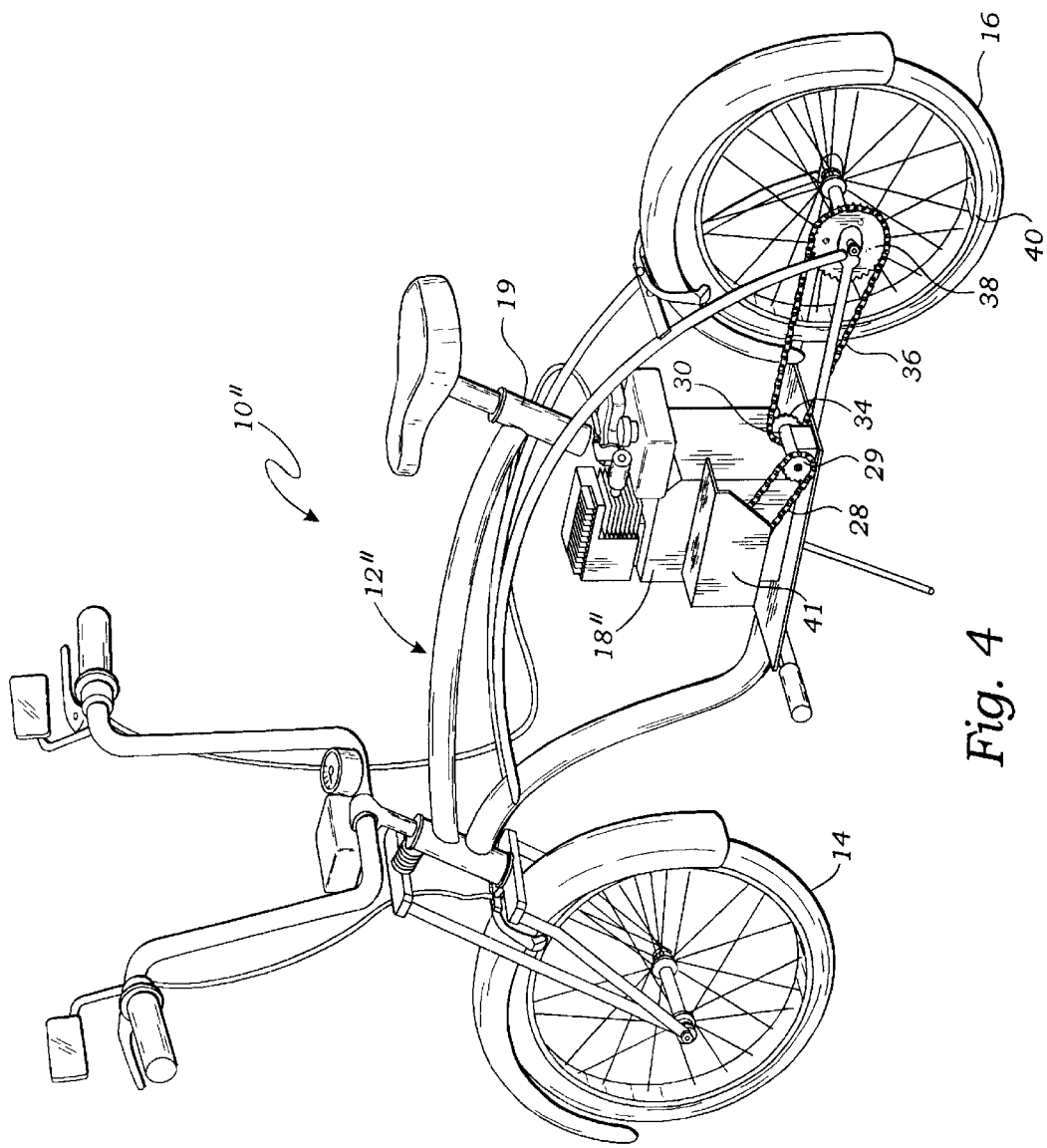
FIG. 4 is a diagrammatic perspective view of a third embodiment of a motorized bicycle of the instant invention having an automatic clutch and a chain drive to a rear wheel.

FIGS. 3 and 4 show further embodiments of the motorized bicycle 10', 10" of the present invention. In these embodiments, frames 12', 12" have been formed or modified to remove a central support 19 and incorporate a centrally mounted engine 18', 18" having an automatic clutch. Motor pulleys 20', 20" extend from one side of the engines 18' or 18", mounted centrally in frames 12', 12", and include a further drive pulley 21 or sprocket secured thereto.

A first drive means, such as a belt 25 (FIG. 3) or a chain 28 (FIG. 4) forms a continuous loop from the drive pulley 21 or sprocket to a driven pulley 27 or driven sprocket 29.

As shown in FIG. 3, driven pulley 27 is connected by a jackshaft 30 to a further pulley 32. The pulley 32 is connected to belt 24 to transmit power from the engine 18' through the belt 25 to the jackshaft 30 and then to the rear wheel extension 22, to rotate rear wheel 16. FIG. 3 also illustrates that a brake cable 31 may be used to actuate a hub brake 32 in rear wheel 16, as by means of one or more hand brakes mounted to the frame 12'.

Turning now to FIG. 4, there shown is a further embodiment having a driven sprocket 29 is connected by jackshaft 30 to a further sprocket 34. The sprocket 34 is connected to a second chain 36 to transmit power to a sprocket 38 secured to a rim 40 centrally thereof and to one side, to selectively rotate rear wheel 16.

Neither of the frames 12', 12" contain pedals or an associated sprocket for pedaling the motorized bicycles 10', 10". A cover 41 may be placed over the first chain 28 or belt 25. Footrests 42 are secured to the frames 12', 12" or to the engines 18', 18", in any desired location.

It therefore can be seen that there have been presented a number of motorized bicycles, which are lightweight and easy to handle, and which provide the convenience of motorized power, without allowing or requiring pedalling. Numerous variations of the present invention are possible while adhering to the principles of the invention. Such variations are contemplated as being a part of the present invention.

What is claimed is:

1. A motorized bicycle, comprising:
    a bicycle frame;
    a front wheel and a rear wheel secured to the bicycle frame for rotary motion thereof;
    a horizontal shaft internal combustion engine replacing pedals and a sprocket of a bicycle in the bicycle frame and having a motor pulley, rotatably mounted on the horizontal shaft internal combustion engine, and actuated by a throttle;
    a drive means connected between the motor pulley and the rear wheel including a drive pulley attached to the motor pulley, a second pulley connected to a jackshaft and a third pulley, and a belt looped around the third pulley and an extension of a rim on the rear wheel; and
    a clutch assembly, selectively linking the horizontal shaft internal combustion engine to the motor pulley for selectively allowing the engine to actuate the drive means to rotate the rear wheel.

2. The motorized bicycle of claim 1, further comprising a clutch pedal for selectively engaging the drive means.

3. A motorized bicycle, comprising:
    a bicycle frame having no pedals and associated sprocket;
    a front wheel and a rear wheel secured to the bicycle frame for rotary motion of the front wheel and the rear wheel;
    a horizontal shaft internal combustion engine mounted centrally in the bicycle frame and having a motor pulley mounted thereon;
    the motor pulley being only rotated by the horizontal shaft internal combustion engine to operate a drive train for rotating the rear wheel;

a clutch assembly selectively linking the horizontal shaft internal combustion engine to the drive train for selectively rotating the rear wheel; and the drive train including a drive pulley attached to the motor pulley, a second pulley connected to a jackshaft and a third pulley, and a belt looped around the third pulley and an extension of a rim on the rear wheel.

4. The motorized bicycle of claim 3, further comprising a clutch pedal for selectively engaging the drive train.

5. A motorized bicycle, comprising:

a bicycle frame having no pedals or associated sprocket;

a front wheel and a rear wheel secured to the bicycle frame for rotation thereon;

a horizontal shaft internal combustion engine centrally mounted in the bicycle frame as the sole means for rotating the rear wheel;

a motor pulley secured to the horizontal shaft internal combustion engine for rotation thereby;

a drive train operatively mounted between the motor pulley and the rear wheel, to selectively rotate the rear wheel;

an automatic clutch assembly connected to the motor pulley for selectively engaging and rotating the motor pulley; and the drive train including a plurality of rotating elements having drive means looped thereon, and being connected to a driven element secured to a rim of the rear wheel.

6. The motorized bicycle of claim 5 wherein the drive train includes a drive pulley attached to the motor pulley, a second pulley connected to a jackshaft and a third pulley, and a belt looped around the third pulley and an extension of the rim on the rear wheel; and wherein the rear wheel includes a hub brake therein.

* * * * *